Jan. 1, 1963  G. M. BODI ET AL  3,071,066
APPARATUS FOR PRESSING GLASS SHEET AND PLASTIC ASSEMBLIES
Filed July 30, 1958  9 Sheets-Sheet 1

INVENTORS
Gilbert M. Bodi
BY and Donald Hauri

Nobbe & Swope
ATTORNEYS

INVENTORS
Gilbert M. Bodi
and Donald Hauri
BY Nobbe & Swope
ATTORNEYS Jan. 1, 1963   G. M. BODI ET AL   3,071,066
APPARATUS FOR PRESSING GLASS SHEET AND PLASTIC ASSEMBLIES
Filed July 30, 1958   9 Sheets-Sheet 5

INVENTORS
Gilbert M. Bodi
BY and Donald Hauri
Nobbe & Swope
ATTORNEYS

Jan. 1, 1963     G. M. BODI ET AL     3,071,066
APPARATUS FOR PRESSING GLASS SHEET AND PLASTIC ASSEMBLIES
Filed July 30, 1958     9 Sheets-Sheet 6

INVENTORS
Gilbert M. Bodi
BY and Donald Hauri

Nobbe & Swope
ATTORNEYS

INVENTORS
Gilbert M. Bodi
and Donald Hauri
BY Nobbe & Swope
ATTORNEYS

INVENTORS
Gilbert M. Bodi
BY and Donald Hauri
Nobbe & Swope
ATTORNEYS

United States Patent Office 3,071,066
Patented Jan. 1, 1963

3,071,066
APPARATUS FOR PRESSING GLASS SHEET AND PLASTIC ASSEMBLIES
Gilbert M. Bodi, Oak Harbor, and Donald Hauri, Toledo, Ohio, assignors to Libbey-Owens-Ford Glass Company, Toledo, Ohio, a corporation of Ohio
Filed July 30, 1958, Ser. No. 751,934
9 Claims. (Cl. 100—171)

This invention relates broadly to the pressing of laminated safety glass. More particularly, however, it is concerned with an improved apparatus for pressing together glass-plastic assemblies, in which the glass sheet components have been bent in both of their axes, prior to final laminating.

The novel embodiments of the pressing apparatus have to do particularly with the rapid and substantially automatic preliminary pressing together of two glass sheets and a plastic interlayer. As is well known, this procedure is necessary, in one way or another, in order that entrained air, moisture and residual vapors will be expelled from between the several layers and that a substantially complete seal is effected around the marginal periphery of the assembly preparatory to final pressure in an autoclave.

The panoramic or "wrap-around" windshield employed in most present-day automobile stypifies the complex bending of glass sheets about their transverse axis. However, more recent styling of automobiles has brought about an upward extension of the windshield in a smooth curve to blend into the roof curvature of the car body. This further curvature, in especially the central area of the windshield, has impressed the need to bend the matched pairs of glass sheets about their transverse axis and substantially simultaneously about the longitudinal axis thereof.

Now the pressing together of assemblies of bent glass sheets and a plastic sheet interlayer to ultimately form a windshield is of course well known. In fact the pressing of such assemblies for a panoramic windshield has been successfully carried out in a satisfactory, rapid manner and substantially as is disclosed in the Canadian Patent No. 546,069, to James H. Boicey et al., assigned to the assignee of the instant application. Briefly stated, by the use of the same or similar apparatus, glass-plastic assemblies, of which the bent glass sheets contain a relatively shallow central curvature which bends outwardly through sharply curving areas into end or wing areas of a shallow or almost flattened curvature, are caused to be pressed together while being rocked or swung through a vertical plane at a controlled, variable rate of speed or motion.

This mechanical handling of the assembly is for the purpose of passing the several layers through a pressing area, formed by pairs of rubber rolls, along the plane of a line that is at all times tangential to the rolls' periphery. In other words, the lines of exerted pressure are at all times maintained perpendicular or normal to the opposed glass surfaces. As will be more specifically described, the advantages of the present apparatus are realized in the provision of pressing rolls which, while being rocked about a substantially horizontally disposed axis, are adapted to automatically press glass-plastic assemblies having substantially flat or planular end areas between which a central area is situated that may or may not be bent in the longitudinal axis.

The principal object of this invention therefore resides in the provision of an improved apparatus for pressing together assemblies of glass and plastic sheets of which the glass sheets have been bent in one or in both of their axes.

Another object is to provide an improved apparatus of the above character wherein pressure exerted against the outwardly directed glass surfaces will be maintained substantially uniform and normal to the said surfaces both during engagement of adjoining planular and curvilinear surfaces of the glass-plastic assembly.

Another object of the invention is to provide an improved apparatus of the above character wherein the pressure directed against the opposed outwardly directed surfaces of a glass-plastic assembly will be maintained substantially parallel to planes coincidental with the longitudinal and transverse axes thereof.

Another object is to provide an improved apparatus wherein rotatably mounted means is included, said means being resiliently urged against the surfaces of a glass-plastic assembly in the line of a plane normal thereto while being rockably moved about a substantially horizontal axis simultaneously.

Another object of the invention is to provide an apparatus of the above character wherein the said rotatably mounted means is adapted to operatively contact one area of a glass-plastic assembly to move the same through a pressing area wherein the lines of pressure are parallel to a plane normal to the transverse axis of the said assembly while alternately being parallel, and then parallel and radially disposed, to planes normal to the longitudinal axis thereof.

A further object is to provide in an apparatus of the above character pairs of rotatably mounted rolls disposed in vertically aligned relation and adapted to engage the surfaces of a glass-plastic assembly in lines of pressure parallel to a plane passing through the transverse axis thereof and certain of the pairs of rolls are supported by means of variable forces that are adapted to counteract the weight of the rolls and their mountings and are operable in planes parallel to a plane passing through the longitudinal axis thereof while any of the pairs of rolls are engaged with the said surfaces in lines of pressure alternately disposed in parallel with, and then radially to, a plane through the said longitudinal axis.

A still further object of the invention is to provide an improved pressing apparatus wherein entry and discharge conveying means for a glass-plastic assembly are arranged and between the opposed inner ends of which a plurality of pressing rolls are supported in parallel and tangential contact, of guiding means adapted to adjustment to guide bent glass sheets of various curvatures from the entry conveying means to said pressing rolls, of means for operatively driving each of the said conveying means and the pressing rolls at a generally common rate of speed, and of a variable control means for causing the pressing rolls to rotate about a common axis in timed relation to movement of the glass-plastic assembly therebetween, said pressing rolls being adapted to freely move in individually disposed pairs into and out of their above-described support in parallel.

Other objects and advantages of the invention will become more apparent during the course of the following description with read in connection with the accompanying drawings.

In the drawings, wherein like numerals are employed to designate like parts throughout the same.

As is well known, laminated safety glass is made up of two or more sheets of glass and one or more sheets of non-brittle thermoplastic material interposed therebetween. This preparatory assembly, or so-called "sandwich," is ultimately formed into a transparent, composite structure under the influence of heat and pressure, as in an autoclave, but before this final operation, the several layers are subjected to one or more preliminary phases of pressing between which the assemblage may be heated. These sequentially occurring operations of pressing and heating serve importantly to drive out entrained air, moisture and residual vapors from between the several layers and then, while the plastic is softened and adherent, to more intimately secure the respectively opposed glass surfaces thereagainst. This is particularly true about the periphery of the sandwich in order to prevent the entry of objectionable, heated oil during the final pressing or autoclave operation.

Figure 1:
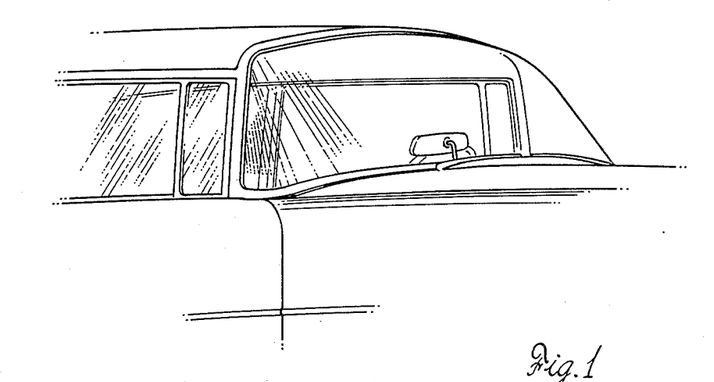
FIG. 1 is a perspective view of an improved windshield in its mounted position in an automobile.
Figure 2:
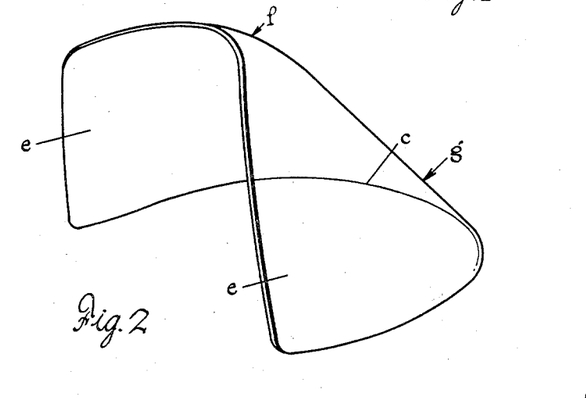
FIG. 2 is a perspective view of the windshield as the same is formed according to the method of this invention.
Figure 3:
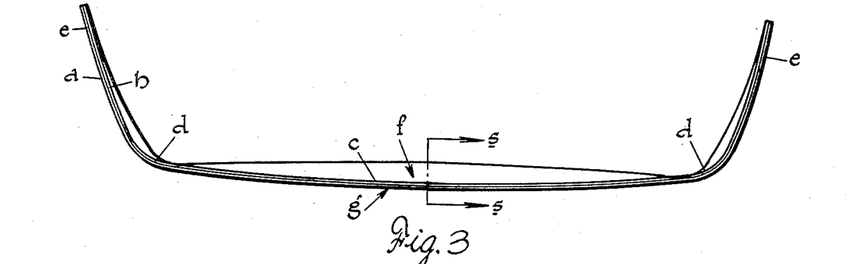
FIG. 3 is a side elevational view of the windshield of FIG. 2.
Figures 4, 5, 6:
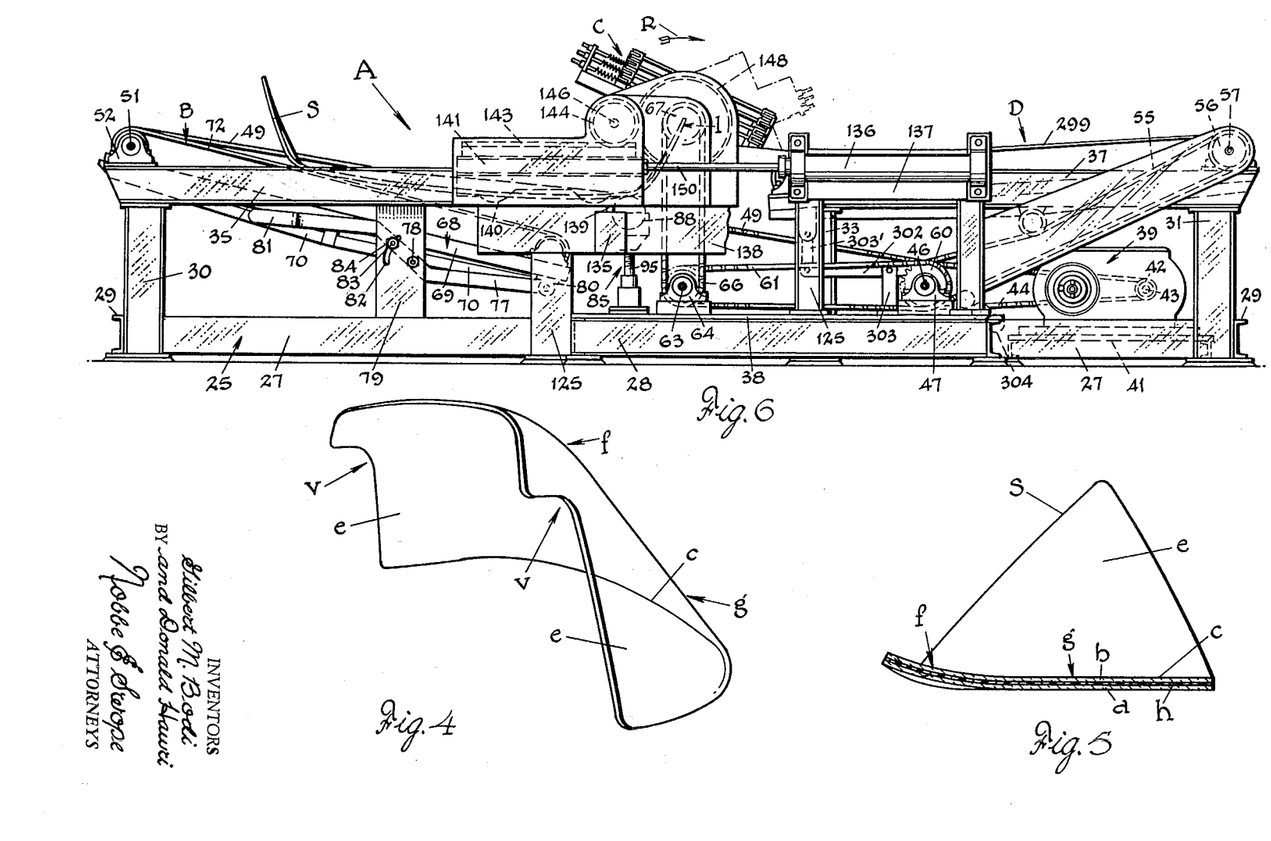
FIG. 4 is a perspective view of a modified form of windshield.
FIG. 5 is a transverse vertcial section view of the windshield as taken on line 5—5 of FIG. 3.
FIG. 6 is a side elevational view of a pressing apparatus constructed in accordance with the invention.

A windshield of the character produced especially from glass sheets that have been bent in both of their axes may aptly be described as a "cap-panoramic" windshield. Such a laminated safety glass structure is illustrated in FIGS. 1, 2 and 3 of the drawings. As viewed in FIG. 3, the glass sheets $a$ and $b$ have been symmetrically bent on each side of the transverse axis and have a wide central area $c$ of a relatively shallow curvature, which, through sharply and upwardly curved corner areas $d$, blends into end or wing sections $e$ defined by a shallow or almost flattened curvature. Additionally, as shown in FIGS. 2, 3 and 5, the sheets $a$ and $b$ will be seen to have been bent about their longitudinal axes to create a smoothly curved zone $f$, sloping upwardly and rearwardly from the lower substantially flat zone $g$. It will therefore become immediately apparent that in order to continuously press the bent sheets $a$ and $b$ together with the plastic interlayer $h$ and to satisfactorily press the same throughout the complexly curved areas $c$, $d$ and $e$ all of which are substantially identical in plane to the lower zone $g$ of the area $c$, and during a continuous operation, to simultaneously press the curved zone $f$, improved means must be provided which will be adapted to as satisfactorily engage the flat surfaces of the end arcs $e$ on the opposite sides of and aligned with the curved zone $f$.

A windshield of this general character and which as well is adapted to be pressed in the apparatus, to be described hereinafter, is illustrated in FIG. 4. This modified structure differs from that shown in FIG. 2 in that each of the end areas $e$ have been cut or notched out as at $v$, to adequately conform with and blend into the styling of an automobile body which may require that the windshield fit in and about the front margin and upper corner of the forward doors of the automobile.

For these purposes, it is herein contemplated, as will be hereinafter more fully described, to provide a pressing apparatus for glass-plastic assemblies having an improved pressing roll frame wherein the rolls are supported in such a manner that assemblies of bent glass, as herein disclosed, can be successfully prepressed in an identically automatic manner.

Figure 7:
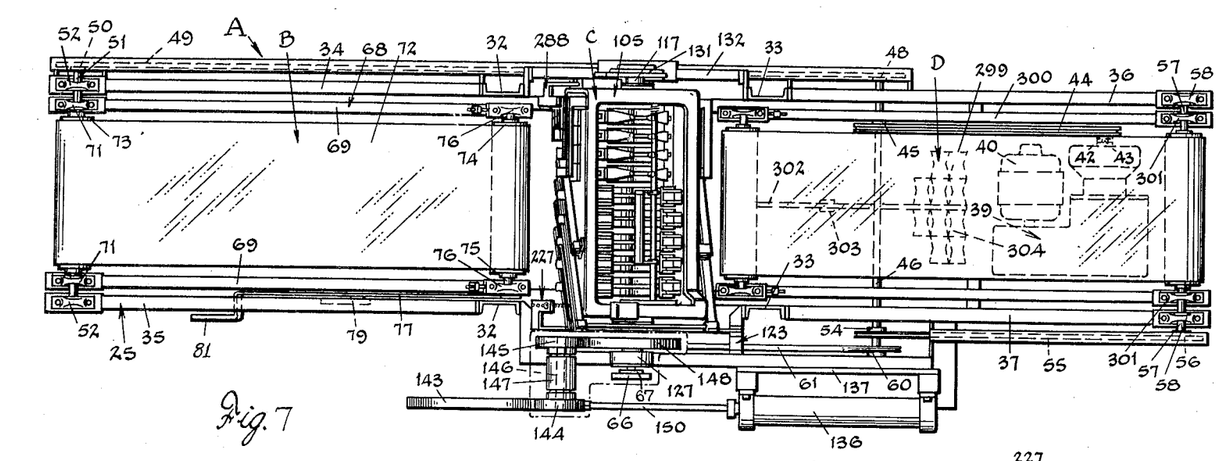
FIG. 7 is a plan view of the apparatus.
Figures 8, 9:
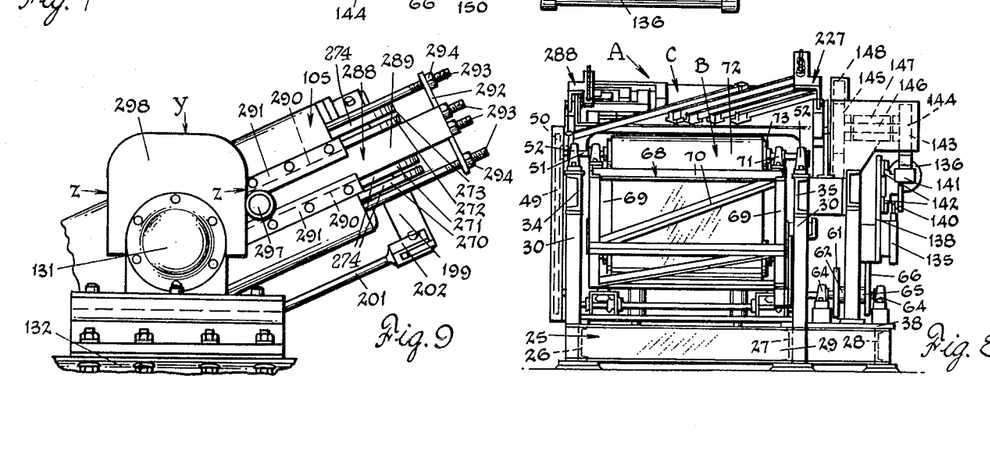
FIG. 8 is a front end elevational view.
FIG. 9 is a fragmentary side elevational view.
Figure 29:
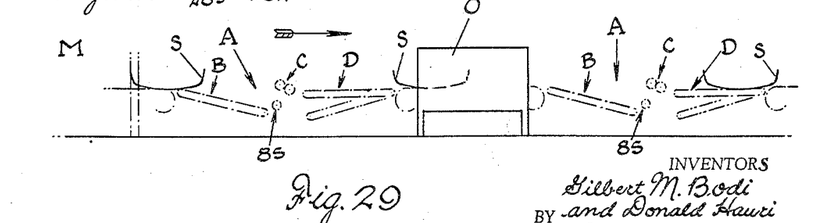
FIG. 29 is a diagrammatic view of a glass-plastic assembly and pressing line.

With reference now to FIGS. 6, 7 and 8 of the drawings, there is disclosed a prepressing apparatus, generally designated by the letter A and having located therein an entry conveyor B, a frame C wherein operatively-mounted pressing rolls are mounted and a take-off conveyor D. It will be appreciated that one such apparatus may be employed, but, preferably, two apparatus, as shown diagrammatically in FIG. 29, are ordinarily employed and that the entry conveyor B in one instance is disposed adjacent to the end of a conveyor line on which the bent glass sheets and the plastic interlayer are assembled and in a second instance is positioned to receive the assembled sheets and interlayer as a "sandwich" after the same has been passed through a conventional heating oven. Likewise, the take-off conveyor D of a first pressing apparatus is situated adjacent the entry end of the heating oven while the similar take-off conveyor of a second pressing apparatus is adapted to deliver the sandwich onto a conveyor line terminating in the area in which the sandwiches are prepared for the final pressing step in an autoclave.

The purpose of these sequentially occurring phases of pressing, heating and again pressing serves initially to expel entrained air, moisture and residual vapors from between the several layers and afterward, while the plastic layer is softened under the influence of heat, to more intimately secure the respective surfaces in positive contact. This is especially true about the perimeter of marginal edge of the glass-plastic sandwich to insure against entry of heated oil, under pressure, during the final pressing or autoclave operation. The objectionable entry of oil is known to produce defective areas in the finished laminated structure and which are commonly known in the art as "blow-ins."

The Structure of the Apparatus

In the above-mentioned figures (FIGS. 6, 7 and 8), it will be seen that the apparatus A structurally comprises a framework, generally designated by the numeral 25 and which includes a base formed by several longitudinally disposed channel members 26, 27 and 28 that are interjoined by transversely arranged channels 29. Secured at one end of the channels 26—27 is a pair of vertically disposed channels or pedestals 30 while at the opposite end of channels 26—27 a pair of pedestals 31 are similarly mounted. Medially between the pairs of pedestals 30 and 31, pairs of vertically disposed channels 32 and 33 are similarly secured to channels 26—27; are suitably spaced from one another, and substantially equally spaced from the vertical transverse axis of the framework 25.

The upper ends of the pairs of pedestals 30—32 carry the opposite ends of horizontal, longitudinally disposed channels or beams 34 and 35. Likewise, at the opposite ends of base channels 26—27, the pairs of pedestals 31—33 are adapted to carry the ends of beams 36 and 37. A suitably positioned support platform 38 is also provided on the base channels 27—28 and generally in the vicinity of the pedestals 32—33 to afford support for operative elements of the apparatus A to be more fully hereinafter described.

The Source of Power

Primarily, the entry conveyor B, the rolls of the pressing frame C and the take-off conveyor D of the pressing apparatus are driven from a variable speed-reduction unit 39, equipped with an electric motor 40 and mounted on a base 41 structurally carried by the channels 26—27. As seen in FIG. 7, this power source is located adjacent pedestals 31 and generally beneath the take-off conveyor D. By means of a double-sprocket 42 on the output shaft 43 of reduction unit 39, a double roller-chain 44 is adapted to drive a related double-sprocket 45 on shaft 46, which is journaled in bearings 47 supported on the framework 25 and substantially transversely disposed with reference to the channels 26—27 thereof. While shaft 46 mounts other sprockets, it fixedly carries a sprocket 48 at one end which by roller-chain 49 is coupled to a sprocket 50 on a shaft 51. Shaft 51 is rotatably mounted in bearings 52 located at the outer ends of beams 34—35 and serves to operatively drive the belt of entry conveyor B.

Shaft 46, adjacent its end opposite sprocket 48, fixedly carries a sprocket 54 which by roller-chain 55 is coupled to a sprocket 56 on shaft 57. The shaft 57 is journaled in bearings 58 mounted on the outermost ends of beams 36—37 and serves to drive the belt of take-off conveyor D as will be hereinafter more fully described. Outwardly of sprocket 54, shaft 46 also mounts a sprocket 60 which operatively drives certain of the rolls in the pressing frame C. This is achieved by roller chain 61 which is entrained about sprocket 60 and a sprocket 62 on shaft 63 journaled in bearings 64 on platform 38. In turn, the shaft 63 by means of sprocket 65 drives roller chain 66 which is also entrained about a sprocket 67 associated with and carried by the operative elements of the frame C.

The Entry Conveyor

As seen in FIGS. 6 and 7, the framework 68 of the conveyor B comprises side rails 69 interjoined by transversely and angularly arranged bracing rails 70. The frame 68, at one or its outermost end, is equipped with bearings 71 that are mounted on the shaft 51 to support the frame 68 thereon and at the same time provide rotative power for the endless belt 72 of the conveyor. For this purpose, a tubular drive roll 73 for the belt is keyed to the shaft 51 more or less centrally between bearings 71. A complementary roll 74 for belt 72 is disposed at the opposite or innermost end of the frame 68 and mounted on a shaft 75 journaled in bearings 76 adjustably mounted on the side rails 69.

For purposes to be more fully described, the inner end of framework 68 is adjustably secured to the framework 25 by means of an arm 77. This arm is pivotally supported by a stub axle 78 on a vertically disposed plate 79, affixed to channel 27 and beam 35. One end of the arm is attached to the inner end of a side rail 69 by a bracket 80 while the opposite end is adapted to be employed as a handle 81. The plate 79 is slotted, as at 82, to receive a bolt 83 which is carried by the arm 77 and by means of nut 84 adapted to secure said arm in fixed relation to the plate. As viewed in FIG. 6, it will thus be seen that the entry conveyor B can be oriented in any desired downwardly inclined plane by manipulation of the arm 77 which affects the elevation of the innermost end of the conveyor framework 68 and as the conveyor is adapted to be swung bodily about the shaft 51 at its outer end. The purpose of disposing the conveyor B in a downwardly inclined plane is to move a glass plastic sandwich, indicated at S, along a predetermined path and in precise angular relation to the pressing frame C in order that the leading end $l$ of the sandwich can be directed thereto along the plane of a line parallel to the normal horizontal axis of the frame. The pressing frame C in like manner is oriented at a suitable angle to receive the leading end $l$. And the respective angular positions of the entry conveyor B and pressing frame C is determined by the character of curvature of the glass sheets $a$ and $b$ about their transverse axes.

Figures 12, 30:
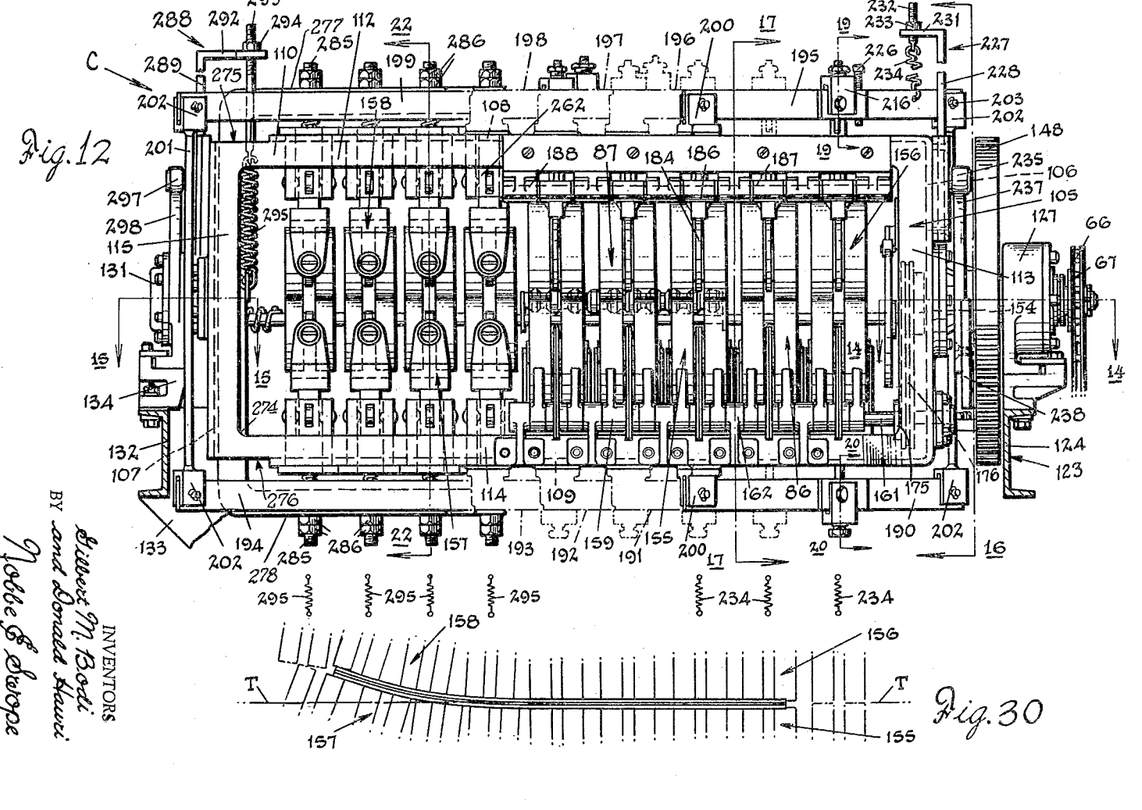
FIG. 12 is a front elevational view of a pressing roll frame employed in the apparatus.
FIG. 30 is a diagrammatic illustration of the pressing operation as carried out according to the present invention.

Now, as a sandwich is carried forwardly on the endless belt 72, the leading end $l$ is caused to engage a suitably mounted roller generally designated 85 and which actually guides the said end in an upwardly directed, angular course toward the pair of rolls, generally indicated at 86 and 87 in FIG. 12, in the pressing frame C. The angular course or plane along which the leading end $l$ of the sandwich is guidingly moved is of course determined by the character of the curvatures in the central portion $c$, the sharply, upwardly curving corners $d$ and the end or wing sections $e$ so that the elevation or lateral position of the guide roll is of considerable importance.

The Guide Roll

Figure 10:
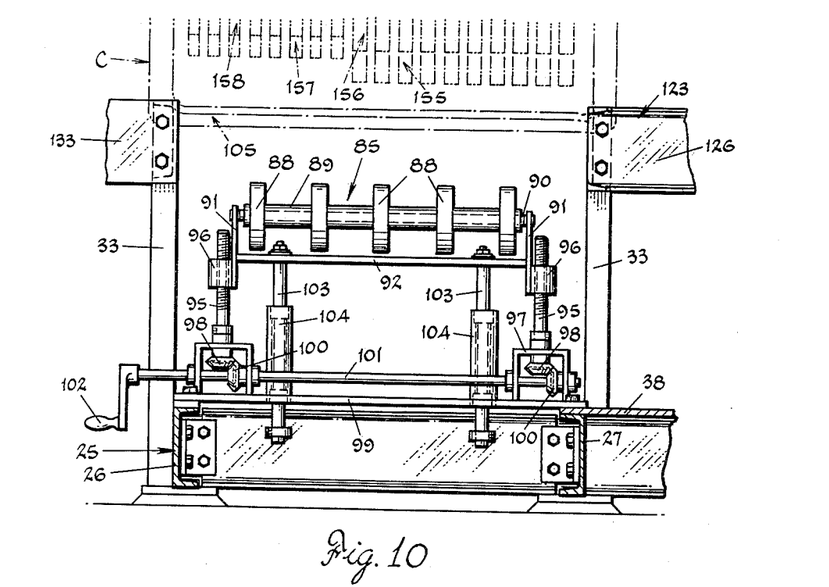
FIG. 10 is an elevational view of a guide roll frame employed in the apparatus.
Figure 11:
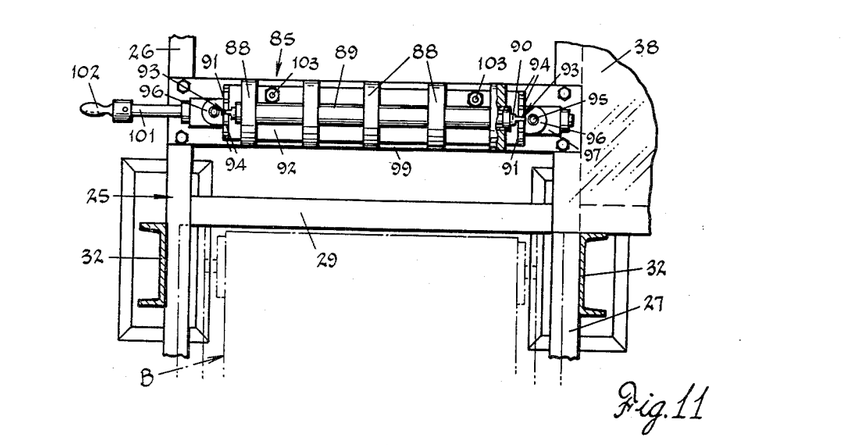
FIG. 11 is a top plan view of the guide roll frame.

The guide roll 85 and the supporting structure therefor, is accordingly located transversely to the path of movement of sandwich S and between the inner end of the entry conveyor B and the pressing frame C, as shown in FIG. 6. More particularly and as viewed in FIGS. 10 and 11, this roll comprises a plurality of rubber rollers 88 that are mounted on a tubular axle 89. The axle 89 is mounted for more or less free rotation on a support shaft 90 by means of contained bearings. Shaft 90 is supported at its ends in the vertically disposed end walls 91 of a platform 92. Preferably, the ends of shaft 90 are flatted as at 93 so as to be received in notches 94 located in the upper edges of the walls 91 in order that the guide roll 85 bodily can be moved in a horizontal plane into several positions of adjustment. To adjust the guide roll 85 in a vertical plane as well, the platform 92 is supported on vertically disposed threaded rods 95 which are received in internally threaded blocks 96 secured on the outer surfaces of walls 91. These rods are rotatably supported in brackets 97 and are equipped with bevel gears 98 at their lower ends. The brackets 97 are carried by a mounting plate 99 supported at its ends on the base channels 26—27. Gears 98 are meshed with complementary bevel gears 100 on horizontally disposed shaft 101 journaled in the brackets 97 and equipped at one of its ends with a crank or handle 102.

The platform 92 is guided in its vertical movements of adjustment by means of depending rods 103 slidably received in bushings fitted into vertically disposed, fixedly mounted sleeves 104 carried by the plate 99. Since the guide roll 85 is thus adapted to be adjustably shifted in a horizontal plane by the various positions to which the flatted ends 93 of the rod 90 can be moved in the notches 94 of the platform walls 91 and in the vertical plane by raising or lowering of the platform 92, it is believed quite apparent that the guide roll can be readily and accurately positioned to the end that the upwardly curving leading end of an advancing glass-plastic assembly will be engaged in rolling contact and guided in an upwardly directed path according to the curvature thereof.

More particularly, the plane of movement into which the end $l$ of the sandwich is directed by the guide roll 85 is parallel to the plane of a line tangential to the peripheral surfaces of the rolls 86 and 87 mounted in the housing 105 of the pressing frame C. As will be noted in FIGS. 12, 13 and 17, this housing is substantially rectangular in form having oppositely disposed end walls 106 and 107; a top wall 108 and bottom wall 109. The front and rear side walls 110 and 111 are defined by inwardly directed flanges or short walls 112, 113, 114 and 115 which bound the open areas in the side walls through which the glass plastic assembly or sandwich is passed in its movement between the rolls 86—87.

The Pressing Frame

Figures 14, 15:
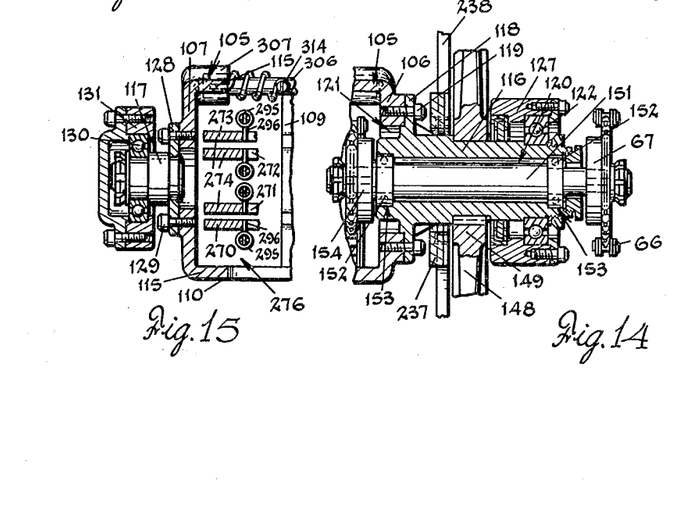
FIG. 14 is an horizontal sectional view as taken on line 14—14 of FIG. 12.
FIG. 15 is an horizontal sectional view as taken on line 15—15 of FIG. 12.

The housing 105 of the so-called pressing frame C is rockably or pivotally mounted between the ends of the entry and take-off conveyors B and D respectively upon channel members secured to and forming integral parts of the framework 25 and so that the axis about which it moves is transverse to the longitudinal axis of the pressing apparatus generally. Thus, the housing is supported by a tubular shaft 116 fixedly mounted on the end wall 106 thereof (FIG. 14) and a stub axle 117 secured to the opposite end wall 107 (FIG. 15).

In the case of the tubular shaft 116, there is provided an annular flange 118 by which said shaft is secured by bolts 119 to the wall 106 and so that the internal bore 120 thereof will be co-axial with an aperture 121 in said wall. Adjacent its outer end, shaft 116 is journaled in a bearing 122 that is generally mounted on a superstructure 123 formed by a horizontally disposed channel 124 supported at its ends on pedestals 125 and connected to the adjacent pedestals of the pairs 32 and 33 by braces 126. The bearing 122 is bodily contained in a mounting block 127 which in one way or another is fixedly secured on the channel 124.

The stub axle 117 at the opposite end of the housing 105 is equipped with a flanged end 128 that is secured by bolts 129 to the end wall 107. Outwardly of flanged end 128, the axle is journaled in a bearing 130 contained in a mounting block 131 on a horizontally disposed channel 132 that is structurally carried by bracing flanges 133 on the adjacent pedestals of the pairs of pedestals 32—33. The block 131, more particularly, may be adjustably mounted in a base 134 that is secured to the channel 132 whereby the said block can be shifted until the aligned axes of the shaft 116 and axle 117 are parallel with transverse axis of the apparatus A. By means of said shaft and axle, the housing 105 is adapted to be swung about an axis that is transversely disposed relative to the longitudinal axis of the apparatus, and, more especially, the predetermined path of movement of a glass-plastic assembly therethrough. This swinging or rocking movement is produced by the cyclic operation of a control system, a cam actuated valve and a cylinder associated therewith. A more complete description of such a typical control system and the operative elements therefor is set forth and claimed in the co-pending application of Carl B. Williams, Serial No. 688,503, now Patent No. 2,995,480 and assigned to the same assignee as the present application.

While the novelty of this invention is neither directly concerned with nor is any claim made thereto, the actual embodiments of this manner of operatively rocking the pressing frame C may be said as will be seen in FIGS. 6, 7 and 8 to comprise a cam actuatable valve 135 which is actively associated with the cylinder 136 mounted on suitable channel framing 137. The valve 135 is carried by a plate 138 and so positioned that the plunger 139 thereof will be responsive to the developed surface of a profile cam plate 140. The surface of cam 140 is developed to rock the frame C according to the characteristics of curvature of the glass-plastic assemblies to be pressed and this rocking action can be readily modified by replacing the cam in the event that assemblies having a different curvature are to be acted upon. Replacement of this one element therefore will affect the rate of rocking motion of the pressing frame C without, however, necessitating other major modifications to its mode of operation.

As shown in FIG. 8, the plate 140 is carried by a slide block 141 suitably mounted for reciprocal motion in gib plates 142. Also mounted on the slide block 141 is a gear rack 143 which is meshed with a spur gear 144. This gear together with a gear 145 is fixedly mounted on a shaft 146 journaled in a bearing 147 carried generally on the superstructure 123. The spur gear 145, in turn, meshes with a spur gear 148 of substantially larger diameter and which is fixedly mounted on the tubular shaft 116 by means of the hub 149 as will be seen in FIG. 14.

Now, by means of an electrical control actuated by a glass-plastic assembly as it enters between the press rolls 86 and 87 and as will be more fully hereinafter described, valve 135 is adapted to direct pressure to the cylinder 136 which, by the piston rod 150 thereof and which is secured to one end of the slide block 141, causes the gear rack to be moved to the right, as indicated by the arrow designated by the letter R in FIG. 6, and then sequentially to the left. Through the train of gears 144, 145 and 148, the frame C will accordingly be rocked in a clockwise direction, as viewed in FIG. 6, through an arc of predetermined length and at a predetermined, variable rate of speed and then counter-clockwise, as viewed in the above-mentioned figure, at a substantially rapid rate of motion to its original position. The rate at which the frame is caused to be rocked is controlled by the cam plate 140, as it is reciprocally moved with the slide block 141, and its resultant influence on the action of the valve 135.

The tubular shaft 116, which as above described is adapted to support the housing 105 at one of its ends, in also mounting the spur gear 148 serves as the rotary driving element therefor. This tubular shaft further rotatably supports a shaft 151 in the bore 120 thereof by means of bearings 152 contained in its counterbored ends 153. Outwardly of the tubular shaft 116, shaft 151 mounts the previously described sprocket 67 that is operatively driven by the roller-chain 66. On its inner end, the shaft 151 fixedly carries a sprocket 154.

The pressing elements for the glass-plastic assemblies, and which have been generally designated 86 and 87, actually comprise a plurality of rubber-tired rolls that are mounted in pairs for substantially individual movement. As contemplated by the present invention, these pairs of rolls are adapted to be supported in vertically aligned pairs having rolling contact with one another and with their points of tangency aligned with the horizontal axial line of the shafts 116 and 117. Another aspect of this invention is concerned with the support of the pairs of rolls in such a manner that a glass-plastic assembly, of which the glass sheets have been complexly bent to conform to the curvature of the so-called panoramic windshield that is substantially flat throughout its longitudinal axis, can be pressed therebetween. Likewise, this novel manner of support enables certain of the aligned pairs of rolls to swing from the common tangential plane to respond to that portion of a sandwich which may, in part, be curved about the longitudinal axis. Since means are herein provided for accomplishing both of these purposes, it is now entirely possible to prepress the oppositely disposed, relatively flat wing areas of either the so-called panoramic or cap-panormic windshields with equal facility while being adapted to prepress a contral area of the assemblies for either of these windshields whether such central areas are flat or have a cross-bend formed therein. And as will be more clearly set forth, improved means is additionally afforded for progressively relieving the weight of the pairs of rolls which at the same time enables them to carry out the function of pressing in a highly efficient manner. In other words, an equilibrium of pressure is maintained at all times.

Figures 16, 17, 18, 19, 20:
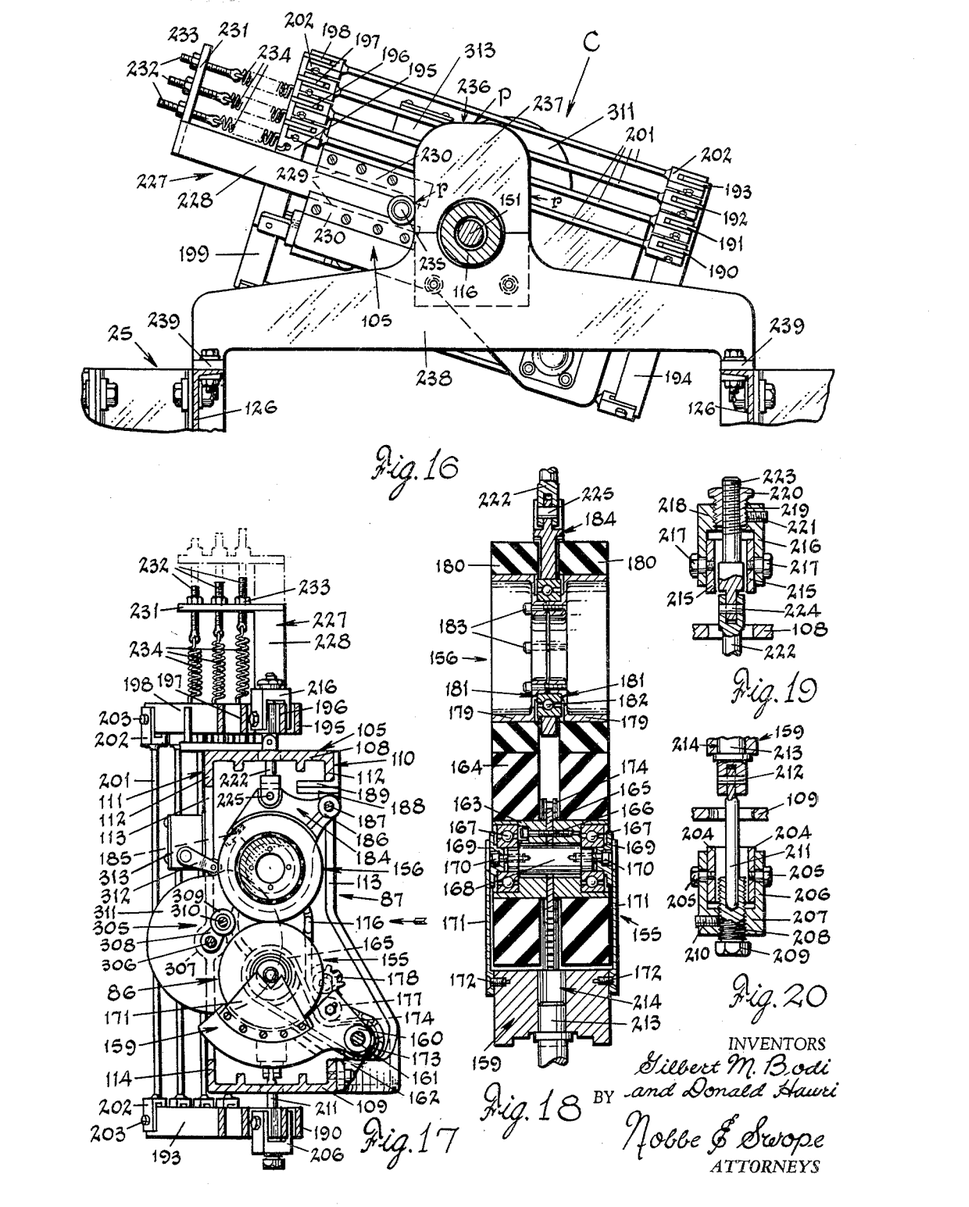
FIG. 16 is a longitudinal vertical section view as taken on line 16—16 of FIG. 12.
FIG. 17 is a transverse vertical sectional view as taken on line 17—17 of FIG. 12.
FIG. 18 is an enlarged detail sectional view of the pressing rolls.
FIG. 19 is an enlarged detail sectional view as taken on line 19—19 of FIG. 12.
FIG. 20 is an enlarged detail sectional view as taken on line 20—20 of FIG. 12.

To clearly distinguish between the pairs of rolls and thereby clarify their particular functions, upon reference to FIG. 12, it will be seen that the lower pairs of rolls 86 in the right hand end of the housing have been designated by the numeral 155; the pairs of rolls 87 vertically aligned therewith by the numeral 156; the lower pairs of rolls 86 in the left hand end of the housing by numeral 157 and the vertically aligned pairs thereabove by the numeral 158. It is also to be understood that the housing 105, as viewed in FIG. 16, is illustrated in a desired position of angularity to receive a glass-plastic assembly as the same is guided thereto.

Each of the pairs of rolls 155 (FIGS. 17 and 18) are generally carried by a shaft supported in a cradle 159 that is equipped with ears 160 and by means of which it is pivotally carried by an axle 161 supported in brackets 162 secured to the housing wall 114. As will be noted in particularly FIG. 18, each roll 155 includes a hub 163 peripherally equipped with a rubber collar or tire 164 suitably vulcanized thereon. Preferably, rubber having a durometer hardness of 50–55 Shore is employed for this purpose. The hubs 163 of each pair are spaced to receive a relatively thin sprocket 165 which is axially clamped and supported therebetween by screws 166. The outer surface of each hub is counterbored to contain bearings 167 in which is journaled a shaft 168. The ends of the shaft 168 are shouldered to support the inner race of the bearings at one corner while the opposite corner rests on a similarly formed shoulder of a mounting collar 169. By means of axially aligned screws 170 threaded into the opposite ends of shaft 168, the collars adjacent the said opposite ends are adapted to firmly position the bearings 167 while their outer races permit entirely free rotation of the rolls. The collars 169 are secured to form integral parts of plates 171 that are affixed by screws 172 to the recessed side margins of the cradles 159. This manner of mounting enables the pairs of rolls 155 to rotate freely and, simultaneously be adapted to pivotally swing about the axis of the axle 161 by reason of their cradle 159 supported thereon.

By means of the sprockets 165, the pairs of rolls 155 are rotatably driven in common from the previously described sprocket 154. For this purpose, each sprocket 165 is coupled to an associated sprocket 173, fixedly mounted on the axle 161, by a roller-chain 174, entrained thereabout. At one end of the axle 161 as viewed in FIG. 12, a sprocket 175 is provided which is connected to the sprocket 154 by a roller-chain 176. The tension of each roller-chain 174 is maintained by a roll 177 adjustably mounted between the ears 160 of the cradles while in a like manner the roller-chain 176 can be properly tensioned by an idler sprocket 178 adjustably mounted on the wall 106. The lower pairs of rolls 155 are thus adapted initially to support the leading end of a glass-plastic assembly as it is carried thereupon and more particularly to progressively move the assembly through the actual pressing area created by the peripheries of the rolls 86 and 87.

On the other hand, the pairs of rolls 156 comprise cup-like hubs 179 equipped with rubber tires 180. These hubs, FIG. 18, contain oppositely disposed concentric shoulders 181 to firmly support the inner race of a bearing 182 when the hubs are secured together by screws 183. The outer race of each bearing 182 is clampingly retained in a split ring-type support collar or plate-like cradle 184 by means of a screw 185 (FIG. 17). Each collar 184 is formed to have an outwardly projecting lug 186 which is cross-drilled to receive an axle 187 which in alternate arrangement is pivotally carried in brackets 188 (FIG. 12). The brackets 188 are severally mounted on an angle plate 189 fixedly carried by the housing wall 112.

Figure 13:
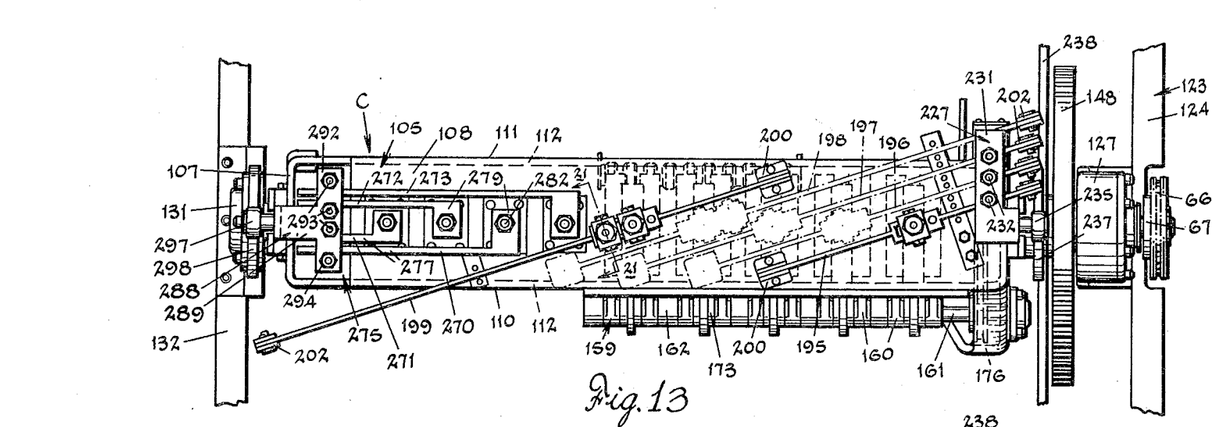
FIG. 13 is a top plan view of the roll frame.

The cradles 159 of the lower pairs of rolls 155 and the cradles 184 of the associated upper pairs of rolls 156 are interjoined by means of levers 190 to 194, and 195 to 199 inclusive, FIGS. 12, 13 and 17. These serve to control the amplitude of pressure exerted by the aligned pairs of rolls and to cause the said pairs to follow one another through any induced rising or falling motions which will displace their areas of tangency either above or below the described common plane. The levers, generally speaking, are arranged to extend diagonally across the housing top and bottom walls 108 and 109 respectively. Thus, each of the levers 190 to 199 are pivotally and individually mounted at one of their ends in similar brackets 200 secured to the adjacent walls 108 and 109. The outer or free ends of the vertically aligned pairs of levers 190 to 199 are interconnected by links 201 having an integrally formed clevis 202 at its opposite ends. By means of pins 203, each clevis 202 is pivotally joined to the levers 190–199 whereby a parallelogram relation is established and the movement of one lever, in response to a related movement of its associated cradle, will be transmitted through the respective link 201 to the oppositely aligned lever to effect a like movement of said opposite lever and the cradle associated therewith. Thus the lower lever 190 and upper lever 195 are linkably interconnected which is also true in the case of the levers 191–196, 192–197, 193–198 and 194–199, the purpose for which will shortly be disclosed.

Primarily the levers 190–199 are adjustably associated with their respective roll supports to enable positioning of the pairs of lower rolls 155 so that their peripheries, in a vertical plane, will be located in the axial line of shaft 116 and stub axle 117 and the pairs of upper rolls 156 will be suitably urged against the associated lower rolls. For these purposes as shown in FIG. 20, each lever 190–194 is formed with an open area described by integral, spaced plates 204; said open area of each lever being substantially aligned with the vertical axial plane of the pairs of rolls 155 and the cradles 159 therefor. Each plate 204, by means of shoulder screws 205, carries vertically disposed stirrups 206 that are centrally tapped in the web block 207 thereof. Threaded plugs 208, having hex heads 209, are received in each of the stirrups 206 and may be secured therein by set-screws 210 as will be seen in FIG. 20. Each plug 208 is equipped with an axially formed socket adapted to receive the end of a rod 211 that is connected by a pin 212 to a plug 213 fitted into a socket or bore 214 formed in the cradle 159. Since the levers 190–194, in each instance, are thus generally pivotally connected to their related cradle 159 by the stirrup 206 and shoulder screws 205, swinging movement of the cradles about axle 161 and the levers at their mounting brackets 200 will be adequately compensated for.

On the other hand, the levers 195–199, having open areas defined by spaced plates 215, each support a vertically disposed stirrup 216 by means of shoulder screws 217, FIG. 19. As in the case of the stirrups 206, stirrups 216 have an integral centrally tapped web 218 which receives an internally and externally threaded sleeve 219 having a hex head 220. The threaded sleeves 219 may be adjustably secured relative to their respective webs 218 by set-screws 221. By means of a link 222 having forked ends, each of the levers 195–199 is connected to its associated cradle 184 by a threaded eyelet rod 223. Rod 223 is threaded into its related sleeve 219 and, by pin 224, is pivotally attached to one forked end of the link 222; the opposite forked end thereof being connected by pin 225 to the respective cradle 184.

Each lever 195–199 carries a leveling set-screw 226 (FIG. 12) which is adapted to bear at one end against the surface of the adjoining top wall 108 of the housing 105 and threadably adjusted until the levers are substantially parallel to the wall surface. Through the associated link 201, this adjusting action is transmitted to the related lever 190–194 which is likewise brought parallel to the surface of the lower wall 109 of the housing. Now, upon release of set-screws 210, the plugs 208 may be turned relative to their support stirrups 206 until the respective cradles 159 have been shifted to position the peripheries of their mounted pairs of rolls 155 in a common horizontal plane coinciding with the axial line of the shaft 116 and axle 117. The sleeves 219, upon release of the set-screws 221, are turned by their head portions 220 and, through the links 222 and rods 223, the cradles 184 will be swung on their support axle 187 until the peripheries of the rolls 156 carried thereon engage the associated rolls 155 for rolling contact therewith. Preferably, the degree of pressure exerted by one pair of rolls against an opposite pair of rolls is based upon the desired pressure to be employed in the pressing operation and the resilient character of the tires 164 and 180. This basic setting is quite important since by the proper positioning of the pairs of rolls 155 the pressing operation will be carried out in the plane of a line coincident with the axis about which the housing 105 is rocked; the plane of rolling contact at the opposite surfaces of the glass-plastic sandwich is tangential thereto and the lines of force perpendicular or normal to this plane at all times.

When the several pairs of rolls 155 and 156 have been arranged by the above-described adjustments, the set-screws 226 are backed away from the top wall 108 so that when the housing is in a vertical position, as is generally illustrated throughout the drawings for simplicity, the combined weights of the involved component parts will, by reason of gravity, operate to swing both plurality of cradles 159 and 184 downwardly, the action being transmitted through the several linkages afforded by the levers 190–194, 195–199 and the links 201. To overcome this natural occurrence there is provided a variable force means or flexible balancing support for several of these linkages which is adapted to increase in its supporting influence in proportion to the gradual tendency of the rolls to move downwardly during rocking of the housing 105 or pressing frame C generally.

For this purpose, the levers 195, 196 and 197, associated with the three outermost pairs of rolls 155, 156, are connected to a slide bar arrangement indicated at 227 in FIGS. 16 and 17. The bar 228 thereof is slidably confined in the ways 229 of a fixed block by gib plates 230; the block and plates being mounted on the end wall 106 of the housing and aligned with the vertical axis thereof. At its outer end, the bar 228 is formed with a laterally projecting arm 231 in which screw rods 232 are threadably located; the several screws 232 being disposed along said arm in vertical alignment with a lever 195, 196 or 197 therebeneath. Each screw is equipped with a lock-nut 233 and its lower end is formed as an eye to carry one end of a coil spring 234. By conventionally attaching the opposite end of each spring to a lever, 195, 196 or 197, as the case may be, it is believed apparent that the tensional characteristics thereof can be modified by the screws 232 until the weight of the affected cradles and pairs of rolls can be suitably balanced or compensated for to the end that when the housing is vertically positioned or passes through a vertical plane in the course of its rocking motion, the rolls will be supported in substantially a free-floating manner and the tangential plane of their peripheries normally maintained in the axis about which the housing is rocked or rotated.

Since the problem of weight will naturally increase and decrease sequentially as the housing 105, is rocked from and returned to the initial position of angularity, shown in FIGS. 6 and 16, means is herein provided for progressively increasing the tension of springs 234 to the end that as the housing is rocked toward and through a vertical plane their influence over the levers 195, 196 and 197 will increase and then diminish as the housing approaches either of the angular positions defined by the limits of its rocking motions.

For this purpose, slide bar 228 is equipped adjacent its lower end with a ball-bearing roll 235 which is supported in rolling contact on the developed surface 236 of a cam plate 237. The cam plate is preferably spaced in horizontally disposed relation to and between the housing wall 106 and the spur gear 148. In order that the cam plate 237 can be readily replaced when desired, the same is mounted by means of screws on a bracket 238 equipped at its opposite ends with bases or feet 239 by which it can be fixedly mounted on the horizontally disposed braces 126 of the superstructure 123. As will be seen in FIG. 16, the cam surface 236 includes a centrally disposed peak area $p$, substantially coincident with a vertical plane through the axis of the housing 105, and oppositely disposed dwell areas $r$. The roller 235, in traversing this surface 236, accordingly will urge the slide bar 228 upwardly as the radial distance of the generated surface increases from area $r$ to area $p$. Upward sliding movement of the the bar 228 will be reflected in a distension of the springs 234 as the rolls and cradles by gravity tend to move downwardly; consequently, this tensional increase of the springs will react to substantially sustain particularly the pairs of rolls 155 and 156 at the desired elevation. Then as the roller is carried from the highest or peak area $p$ to the opposite dwell area $r$, downward movement of the bar will operate to relax the springs proportionately to the diminishing influence of gravity occasioned by the weight of the rolls and cradles. The purpose for so carefully bringing about this free-floating condition, as will be more fully hereinafter set forth, is to offset the undesired imposition of weight on any area of a sandwich as it is being pressed.

Figure 21:
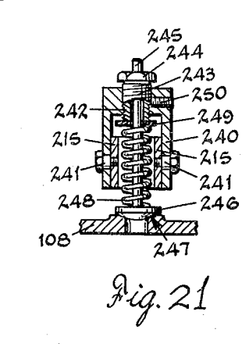
FIG. 21 is an enlarged detail view as taken on line 21—21 of FIG. 13.

Now with reference to the pairs of levers 193—198 and 194—199, it will be seen in FIGS. 13 and 21 that while they are each substantially the same as previously mentioned in connection with levers 190—192 and 195—197, the levers 198 and 199 are additionally equipped to provide a resilient cushioning influence against deflection of the associated pairs of rolls, upwardly or downwardly, from the mentioned tangential plane. As will be apparent in FIG. 12, the pairs of levers 193—198 and 194—199 are associated with the most centrally located pairs of rolls 155 and 156 which are relatively the least normally to be affected by bent curvatures about the longitudinal axis of the glass sheets. For this purpose and as shown in FIG. 21, each of levers 198 and 199 supports a second stirrup 240 by means of shoulder screws 241 in the spaced plates 215 thereof. Each stirrup 240 is centrally tapped in its web 242 to receive an externally threaded sleeve 243 having a conventional hex head 244. A rod 245 is reciprocally supported in the sleeve and one end is formed as an enlarged head 246 operable substantially as a spherical bearing seated on a suitable surface 247 finished on the outer surface of top wall 108. Between the rod head 246 and a washer 249 at the innermost end of sleeve 243 a compression type coil spring 248 is interposed.

Upon adjustment of the sleeves 243 relative to their respective stirrup web 242, after loosening of set-screws 250 the expandable characteristics of the springs 248 can be modified to control the extent of their influence on the levers 197 and 198. Thus, after an initial adjustment as determined by the leveling set-screws 226, the coil springs 248 will be adapted to absorb any enforced movements of the related pairs of rolls which movements will be transmitted to the pairs of levers 193—198 and 194—199.

Figures 22, 23, 24, 25:
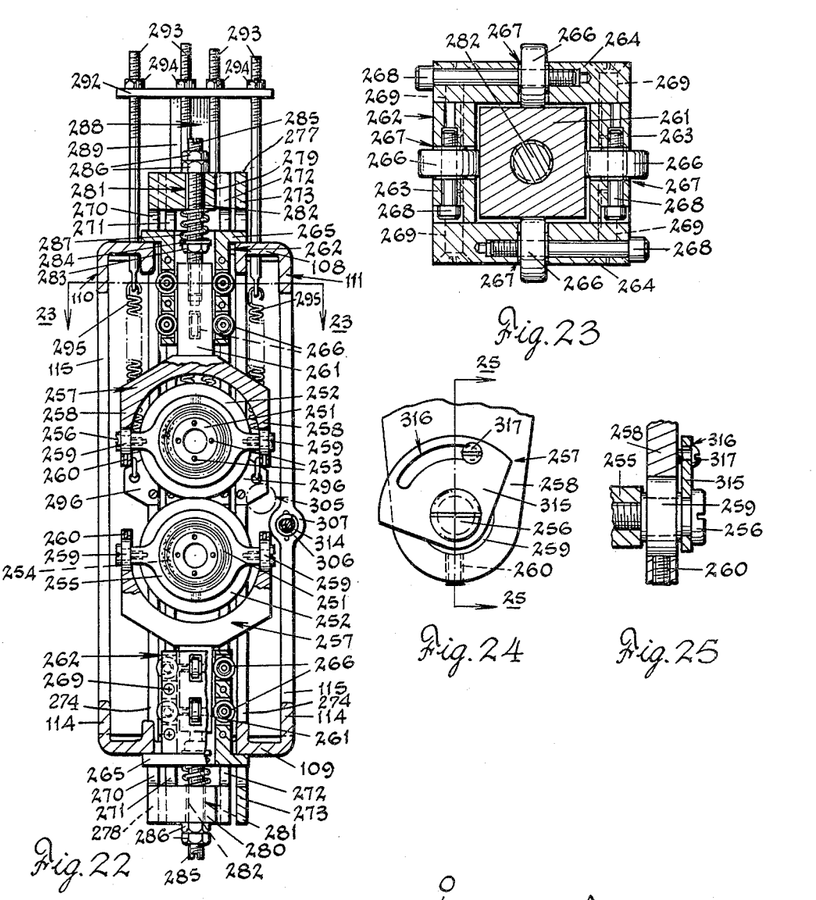
FIG. 22 is a transverse vertical sectional view as taken on line 22—22 of FIG. 12.
FIG. 23 is an enlarged horizontal sectional view as taken on line 23—23 of FIG. 22.
FIG. 24 is a fragmentary elevational view of a modified form of construction.
FIG. 25 is a transverse sectional view as taken on line 25—25 of FIG. 24.

Upon reference to FIGS. 12 and 22, wherein the pairs of rolls 157 and 158 are shown in relation to one another and the adjacent roll pairs 155 and 156, it will be seen that each of rolls 157 and 158 are of less diameter and width which allows the same to swing about horizontal axes into angularly disposed planes with reference to one another. As herein contemplated, the pairs of rolls 157 and 158 are generally situated in the path of a glass-plastic assembly wherein there may be a cross bend about the longitudinal axis. However, as shown in FIG. 12, these pairs of rolls are normally aligned in a horizontal plane coincident with the peripheries of one another and with the pairs of rolls 155 and 156. The pairs of rolls 155 and 157, forming the pressing roll 86, and the pairs of rolls 156 and 158, forming the roll 87, will thus be seen to be adapted to operate in a common tangential plane coincident with the axes of shafts 116 and 117 thereby pressing the entire surfaces of a glass-plastic assembly for a so-called "panoramic" windshield or the opposite relatively flat end areas of an assembly having a central area containing bends in both directions with equal facility.

To mount the rolls 157 and 158 for such purposes each is formed with a hub 251 equipped with a rubber tire 252 and, as in the case of the hubs 179, the hubs 251 are interjoined by screws 253 to clamp the inner race of a roller bearing 254 therebetween. The outer race of the bearing is fixedly mounted in a vertically disposed plate 255. The opposed ends of each plate 255, in a substantially horizontal plane, are adapted to receive the threaded ends of shoulder screws 256 by which the plate and rolls are carried by a yoke member 257. More especially, the ends 258 of the yoke carry roller-bearings 259 in which the shouldered portions of screws 256 are journaled. These bearings are locked in the yoke-ends 258 by means of set-screws 260. Thus, the rolls 157 and 158 are rotatable about the axes of hubs 251 and similtaneously are adapted to be pivotally swung about the aligned axes of bearings 259.

Each yoke 257 has a vertically disposed bearing post 261 of square cross-section which is reciprocally supported on a sleeve 262 having integral walls 263 and 264 arranged in parallel and of similar cross-section. In each instance, the sleeves 262 are equipped with a mounting flange 265 by which they are fixedly mounted on and project downwardly or upwardly, as the case may be, from either the top wall 108 or bottom wall 109 respectively. To support the posts 261 in freely slidable relation within the sleeves 262, roller bearings 266 are provided in the walls 263 and 264 as shown in FIGS. 22 and 23. Thus, each wall 263 or 264 is provided with vertically spaced slots 267 in which the bearings 266 are mounted on shoulder screws 268 serving as axles therefor.

One manner of easily constructing the bearing sleeves 262 is disclosed in FIG. 23 wherein it will be noted that while the walls 263 are formed integrally with the flange 265, plates, forming oppositely disposed walls 264, are secured to the opposite edge surfaces of the interposed walls 263 by means of screws 269. In assembling a sleeve, it may be said that the bearings 266 positioned in slots 267 of walls 263 are rotatably mounted therein by means of their respective screws 268. The plates 264, when positioned relative to the walls 263 and secured by screws 269, are then fitted with bearings 266 on screws 268. This enables ready and convenient disassembly and replacement of any of the actively employed parts—such as the bearings 266. It will thus become apparent that the posts 261 are freely supported within the sleeves 262 and guided for substantially vertical movements by the several bearings 266.

The bearing posts 261 of each of the vertically aligned pairs of rolls 157 and 158 are interconnected by means of C-shaped bars 270, 271, 272 and 273. The vertically disposed webs 274 of these bars are spaced from and aligned with the inner surface of the housing end wall 107 while the adjoining areas of the top and bottom walls 108 and 109, respectively, are recessed as at 275 and 276 for freedom of movement of the bars therethrough. Each bar has a substantially horizontally disposed arm 277 located in spaced relation from the top wall 108 and a like arm 278 spaced from the bottom wall 109. The end of each arm 277 or 278 is formed to provide a support block 279 and 280, respectively, which is aligned with the operatively associated post 261 of each of the several yokes. As shown in FIG. 13, the respective blocks 279 and 280 are disposed on alternately and oppositely disposed surfaces of the arm portions 277 and 278 of the bars to permit a suitably compact arrangement.

Each block 279 or 280, as seen in FIG. 22, is formed with a centrally disposed passageway or bore 281 in which is more or less loosely received a threaded rod 282. The rod is threaded at one end into and is thus supported in axial alignment with an associated post 261. The rod, being threaded, is adapted by adjusting nut 283 to support a washer 284 in spaced relation to the end of the associated post 261. The opposite end 285 of each rod, passes through the respective bore 281 in a block 279 or 280 and outwardly thereof carries lock-nuts 286. Between the washer 283 and the adjacent end of the block, a compression coil spring 287 is interposed to exert its effort against the rod 282 and thereby upon the associated yoke 257 and the pair of rolls mounted thereon.

Now, upon outward rotation of the nuts 286, along the associated rod 282, the characteristics of the related spring 287 will be modified but, what is more important, manipulation of the lock-nuts 286 on axially aligned rods 282 will operate to shift the yokes 257 relative to the ends of the housing walls 108 and 109 until the peripheries of rollers 157 and 158 will be located in a plane coincident with the aligned axes of the shaft 116 and axle 117. It will thus be seen that the pairs of rollers 157 and 158 can initially be located in substantially the same manner as the pairs of rollers 155 and 156.

Likewise, the pairs of rollers 157 and 158 are adapted to be elastically supported while they are carried by the housing 105 through a vertical plane. This is particularly important with reference to these pairs of rollers since they are aligned with the path traversed by the upper zone (*f*) of the central area (*c*) of a glass-plastic assembly and it is in this zone that the glass sheets of the assembly may have been bent about their longitudinal axis. Thus, as in the instance of the levers 190—195, 191—196 and 192—197, the C-bars 270 to 273, inclusive, are connected to a slide-bar arrangement generally indicated at 288 in FIG. 9. The actual bar 289 thereof is slidably confined in the ways 290 of a fixed block by means of gib plates 291; the block and plates being mounted on the end wall 107 of the housing 105 and aligned with the vertical axis thereof. At its outer end, the bar 289 is formed with a laterally projecting arm 292 in which screw rods 293 are threadably located; the several screws 293 being disposed along the said arm in suitably aligned relation with a C-bar 270, 271, 272 or 273 therebeneath. Each of the screw rods 293 is equipped with a lock-nut 294 and at its lower end is formed as an eye to carry one end of a coil spring 295. As will be seen upon reference to FIG. 22, the opposite end of each spring 295 is attached by a clip 296 secured to the vertically disposed web 274 of the respective bar. Also, as noted in this figure, it will be noted that for ease of arrangement the screw rod 293 is spaced outwardly from its associated C-bar 270; the rods 293 for bars 271 and 272 in spaced relation therebetween and the rod 293 for bar 273 in outwardly spaced relation therefrom.

The slide bar 289 is equipped adjacent its opposite and lower end with a ball-bearing roll 297 that is supported in rolling contact with the developed surface of a cam plate 298. The plate 298 is fixedly mounted in vertical disposition on the mounting block 131 and in a like manner to the cam plate 237 includes a centrally disposed peak area *y*, substantially coincident with the vertical plane through which the housing 105 is rocked, and oppositely disposed dwell areas *z*. The roll 297, in traversing the generated surface of the plate 298, accordingly will urge the slide-bar 289 upwardly and downwardly as the radial distance of the surface increases and decreases from one area *z*, the high area *y* and the second dwell area *z*.

It will be appreciated that the sustentation of weight imposed by the individual pairs of rollers as they tend to fall due to the force of gravity must be governed quite as closely, if not more so, as the control of the weight of rolls 155 and 156 by the slide-bar arrangement 227. Thus, adjustment of the lock-nuts 294 on the individual screw rods 293 can be suitably varied to the end that, by way of example, the tension of spring 295 associated with C-bar 270 and the outermost pair of rolls will be considerably greater than a comparable degree of tension exerted by the spring 295 associated with the C-bar 273 and the innermost pair of the rolls 157 and 158. Conceivably the tensions of springs 295 influencing the intermediate pairs of rolls can be established between the relatively high degree of tension in the first instance and the relatively lower degree of tension in the second instance. This will enable the outermost pairs of rolls 157 and 158 to adequately perform their pressing operation with an equilibrium of pressure and at the same time be resiliently sustained against enforcing any objectionable pressure on the margins of the sandwich in the curved zones of glass sheets curvedly bent in both of their axes.

Another feature of the concurrent action of the slide-bars 228 and 289 resides in the fact that should an assembly, incorporating bends in both axes, shift slightly upward in the vicinity of the outermost pairs of rolls 155 and 156, and as the housing 105 is passing through a vertical plane, the upwardly directed motion of the slide-bar 228 will counteract the gravitational effort of particularly these pairs of rolls. Accordingly, in the event that the glass-plastic assembly is more or less temporarily borne more in the medial portion of its central area or in the vicinity of the centermost pairs of rolls 155 and 156, the efforts of the various springs 234 together with the springs 295 will positively offset undesired pressures along the opposed margins of the assembly.

The Take-Off Conveyor

As the glass-plastic assembly is moved outwardly and away from the pressing rolls 86 and 87, and as the pressing frame C approaches the position as indicated in broken line in FIG. 6, said assembly S is received on and carried forwardly on the endless belt 299 of the take-off conveyor D. This conveyor has substantially the same structure as that of the entry conveyor B. That is to say, the framework 300 therefor is equipped at its outer end with bearings 301 by which said framework is swingably mounted on the previously described shaft 57. Said shaft, as in the case of oppositely disposed shaft 51, in being operatively driven, also provides power for driving the endless conveyor belt 299. The conveyor D is adapted to be swung downwardly under the increasing weight of a sandwich and then to rise as an equilibrium is reached and the sandwich increasingly moves into the vicinity of the shaft 57. For this purpose, the framework 300 is counterbalanced by means of a weighted arm 302 pivoted on a bracket 303. One end of the arm 302 is joined to the framework by a link 303' while the opposite end of the arm is provided with weights 304 as shown in FIGS. 6 and 7.

The Complete Operation

As diagrammatically illustrated in FIG. 29, the heretofore described sheets of glass a and b that have been optically matched, bent in pairs and then thoroughly cleaned are assembled together with a non-brittle thermoplastic sheet h in an air-conditioned room M and in sequence are carried to the entry conveyor B of a first prepress apparatus. As the leading upwardly rising end (l) of the sandwich is carried over the guide-roll 83, it is caused to rise and consequently change the path of its general movement. Upon entering and passing between the pressing rolls 86 and 87, the leading end engages and causes a switch control lever arm 305 to be swung downwardly. As illustrated best in FIG. 17 and as a sandwich is moving in the direction of the indicated arrow, which in this particular figure is reversed from the normally described and/or inferred direction of motion, this lever 305 comprises a main support shaft 306, the ends of which are suitably journaled in bosses 307 formed in the oppositely disposed web portions 113 and 115 of housing wall 111. Carried by means of arms 308, secured in spaced relation to the shaft 306, are a series of rubber rollers 309 on a shaft 310. Adjacent wall portion 113, shaft 306 also fixedly mounts a cam plate 311 adapted to engage and activate the control arm 312 of switch 313.

The switch 313, according to the embodiments disclosed in the above-mentioned Williams' application, Serial No. 688,503 now Patent No. 2,995,480, instigates the direction of pressure to cylinder 136 thereby causing the piston rod 150 to be moved inwardly. This action inter alia causes the profile cam 140 to progressively control the pressure to cylinder 136 and accordingly the movement of said cam and associated rack 143. In this train of events, the spur gear 148 is driven to rock the pressing frame housing 105 in the direction of the arrow R, FIG. 6, at a rate of motion commensurate with the control of cam plates 140 and the curvature of the sandwich about the transverse axis thereof. The purpose of this controlled motion and according to the method of preliminary pressing glass-plastic assemblies is, as earlier mentioned, fully described in the Boicey Canadian patent, No. 546,069. In any event, the general relative positions of the pairs of rolls 155 to 158, inclusive, during the passage of an end or wing area e therebetween will be substantially as shown in FIG. 12, or indicated by the axial line T in FIG. 30. However, according to the embodiments of the present invention, when the central area of an assembly S that is bent in both of its axes passes between the said rolls, the pairs of rolls 155 and 156 will generally remain in the plane of the line T but the pairs of rolls 157 and 158 will rise in agreement with the curved upper zone (f) of the central area (c) while simultaneously swinging angularly in planes that may, and probably will, be non-parallel with the planes of adjoining pairs of rolls either 157—158 and/or 155—156. Thus, while the degree of pressing pressure is maintained constant, or in equilibrium, and the lines of pressure at all times normal to the contacted surface areas, the gravitational weight of the pairs of rolls 157 and 158 is controlled in a "free-floating" condition. In other words, the desired active pressure is held at a maximum while the imposition of objectionable weight is reduced to a minimum.

Now, as the following end e is passing between the aligned pairs of rolls, the pairs of rolls 157—158 collectively, and at the same time, individually swing into planes of substantially parallel alignment with one another and with their peripheries coinciding with the line T. Alternatively, in the event a glass-plastic assembly, of which the sheets are bent about the transverse axis only, is to be pressed, the pairs of rolls 155—158 inclusive, are adapted to carry out their intended functions while positioned as illustrated in FIG. 2 without adjustment.

When the following end (e) of the assembly is moved from between the rolls, it ultimately becomes separated from the control lever 305. A coil spring 314, FIG. 15, is then adapted to return the lever to its original rest position. Then, as the assemblies S are discharged from the take-off conveyor of the first pressing apparatus, indicated in FIG. 29, they are borne through a conventional type of heating oven O wherein the plastic interlayer is rendered more adherent to the opposed glass surfaces. Emerging from the oven and before arriving in an area adjoining the final laminating step in an autoclave, the sandwiches preferably are passed through a second pressing apparatus wherein the various components of the sandwich are more fully pressed together and a suitable peripheral edge seal is brought about.

While the swinging motions of the pairs of rolls 157 and 158 about the aligned axes of screws 256 has heretofore been broadly inferred as being unrestrained, it may in some instances be found advantageous to control such motions. For this purpose, there is shown in FIGS. 24 and 25, an arcuately slotted plate 315 that is clampingly supported so as to swing with the screws 256 and plate 255. Suitably, the plate is held on the shouldered portion of the adjoining screw and tightly against the inner sleeve race of the bearing 259. The arcuate slot 316 of the plate 315 is preferably located therein to receive a screw 317 near one end and to move relative to said screw when the plate 255 and associated pair of rolls are swung or carried radially or generally to positions shown in FIG. 30. Obviously undesired reverse radial movement will be arrested by engagement of the slot end with the screw which will prevent the rolls from assuming unwanted "cocked" positions. As well, the similar plates for the lower pairs of rolls would be provided with slots enabling swinging motion in a direction opposite to that indicated.

Figure 26:
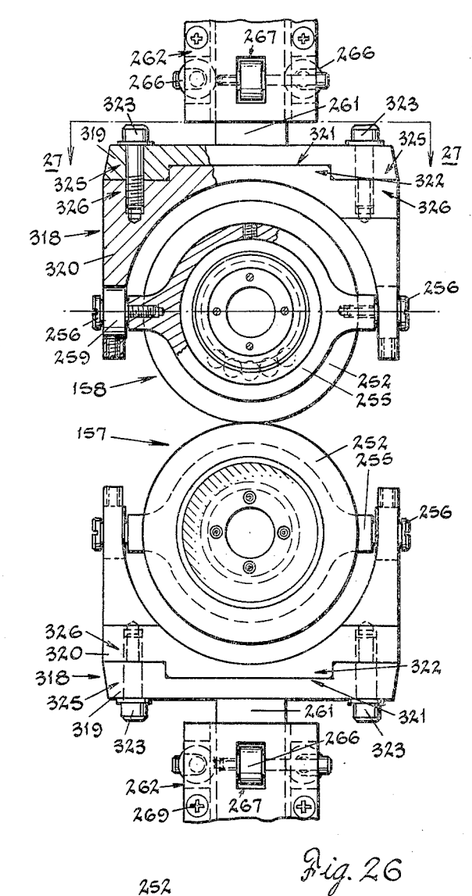
FIG. 26 is an enlarged elevational view, partly in section, of a modified form of roll support.
Figure 27:
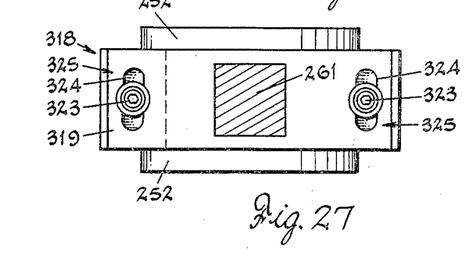
FIG. 27 is a plan view of the modified support as taken on line 27—27 of FIG. 26.

It is further proposed to employ a support for the pairs of rolls 157 and 158 that will enable them to be shifted to positions of non-alignment in a rest position but so as to be aligned with a plane through their respective axes when carrying out the pressing operation. For this purpose, a modified form of yoke 318 may be substituted for the heretofore described yoke 256. The modified yoke is formed of two parts, 319 and 320; the part 319 or base portion including the vertically disposed bearing post 261 while the part 320 is adapted at its respective ends to mount the bearings 259 for screws 255. As shown in FIG. 26, the parts 319 and 320 are equipped with mating surfaces whereby part 320 is adapted to be shifted relative to the base part 319 transversely to its longitudinal axis. Thus, the base 319 has a slideway 321 recessed in the face thereof and the part 320 has a corresponding lug or boss 322 finished to co-operatively slide therein. The parts 319 and 320 are adjustably secured together by means of screws 323 that are passed through slots 324 in the ends 325 of the base 319 and threaded into the opposite ends 326 of the part 320.

Figure 28:
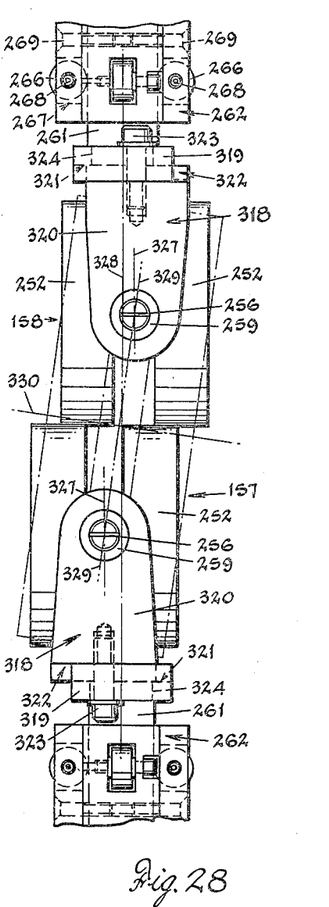
FIG. 28 is an end elevational view of the roll support.

As seen in FIG. 28, when it is desirable for any of the pairs of rolls 157 and 158 to be arranged so that the peripheries thereof will be accurately aligned when a portion of a surface curved in the longitudinal axis is passing therebetween, the vertical axial line 327 of each pair of rolls is shifted an equal or proportional amount from the normal vertical axis 328 of the yoke member. In the rest position, or while pressing areas of an assembly wherein there is no bend about the longitudinal axis, the contacting peripheries of the rolls will appear as indicated in full line; however, when engaged in the pressing operation and traversing the surfaces of an assembly that may include such a curvature, the pairs of rolls will temporarily assume positions of alignment as shown in broken line.

Obviously the extent of distance from the vertical axis line 328 to which the related pairs of rolls are moved will be determined by their position transversely in the axial line through hollow axle 116 and stub shaft 117. Stated otherwise, the, or each, desired angular plane into which the pairs of rolls will swing to assume positions of alignment will be dependent upon their individual positional relationship to the zone of curvature and the plane of a line 329 perpendicular to a line 330 in this particular zone which plane will simultaneously then become parallel to a line through the said angularly disposed axes of the pairs of rolls.

Accordingly, it has now been found after experimental development that the normally successful prepressing of glass-plastic assemblies which are bent about their transverse axis can as well carry out the preliminary pressing of such assemblies having areas bent about both of their axes. This enables a pressing apparatus of the character herein described to operate satisfactorily and without modification upon glass-plastic assemblies whether the glass sheets have been bent about one or both axes. In addition to these advantageous features, by the means of the cam-controlled variable forces, it is possible to reduce, if not completely eliminate, the imposition of weight along the margins of the assembly. This, as will be readily apparent, could produce, especially in the case of assemblies for cap-panoramic windshields, downward deflection of the glass sheets which would tend to cause the breakage thereof. As well, by progressively overcoming the imposition of undesired weight by means of such variable forces, it is possible to maintain an equilibrium of pressure against the opposed surfaces of the glass sheets in the areas actively under pressure.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

We claim:

1. An apparatus for pressing a bent glass-plastic assembly composed of two sheets of glass and an interposed layer of plastic material, comprising a frame, a plurality of pairs of pressing rolls arranged side by side in said frame, each pair of rolls including an upper roll and a lower roll, means for passing a glass-plastic assembly between the rolls of said pairs to effect the pressing thereof, means for rocking said frame and the pairs of pressing rolls carried thereby about a substantially horizontal axis during the pressing of the assembly, means for resiliently mounting certain pairs of pressing rolls in said frame so that the rolls of each pair move as a unit, and means for off-setting the weight of the rolls on the glass-plastic assembly during rocking of the rolls and passage of the glass-plastic assembly therebetween to prevent the weight of the rolls from being added to the pressure normally exerted by the said rolls upon the glass-plastic assembly as it passes therebetween.

2. An apparatus for pressing a bent glass-plastic assembly as claimed in claim 1, in which the pressing rolls of certain pairs are mounted for swinging movement in planes angularly disposed to the vertical plane in the longitudinal axis of the glass-plastic assembly while simultaneously moving in said vertical plane to enable the pressing rolls to follow the curvature of the bent assembly.

3. An apparatus for pressing a bent glass-plastic assembly as claimed in claim 1, in which the means for off-setting the weight of the pressing rolls on the glass-plastic assembly includes means for varying the resiliency of the roll supporting means in timed relation to the rocking of said rolls.

4. An apparatus for pressing a bent glass-plastic assembly as claimed in claim 1, in which the means for resiliently supporting the pressing rolls comprises springs for supporting the pairs of rolls, and the means for off-setting the weight of the pressing rolls on the glass-plastic assembly comprises a cam operable in timed relation to the rocking of said rolls to increase and then decrease the tensions of said springs.

5. An apparatus for pressing a bent glass-plastic assembly as claimed in claim 1, in which the means for resiliently mounting the rolls comprises vertically movable support members for supporting the pairs of rolls in the frame, and including spring means for resiliently supporting said support mmebers, and wherein the means for off-setting the weight of the pressing rolls on the glass-plastic assembly comprises cam operated means for raising and then lowering the support members and rolls carried thereby during the rocking of said rolls to increase and then decrease the resiliency of said spring means.

6. An apparatus for pressing a bent glass-plastic assembly as claimed in claim 5, in which the support members comprise substantially C-shaped bars, one for each pair of rolls, and the spring means comprise coil springs, one for each C-shaped bar.

7. An apparatus for pressing a bent glass-plastic assembly as claimed in claim 6, in which a slide bar is carried by said frame, the coil springs are secured at one end to said slide bar and at the opposite end to said C-shaped bars, and wherein there is provided a fixed cam which, upon rocking of said frame, actuates the slide bar to increase and then decrease the tension of the coil springs.

8. An apparatus for pressing a bent glass-plastic assembly as claimed in claim 7, in which there is provided a single slide bar to which all of the coil springs are secured, and including means for adjusting the tension of the coil springs independently of one another to vary the amount of tension as between the slide-bar and the individual C-shaped bars.

9. An apparatus for pressing a bent glass-plastic assembly as claimed in claim 7, in which the fixed cam has a generated surface, means operably connecting the slide-bar and the fixed cam, said surface of the cam being generated to cause sequentially reciprocal movements of said slide-bar in timed relation to the rocking of said frame.

References Cited in the file of this patent

UNITED STATES PATENTS

| | | |
|---|---|---|
| 492,613 | Pierce | Feb. 28, 1893 |
| 1,334,588 | Bartelstone | Mar. 23, 1920 |
| 2,544,133 | Carlson | Mar. 6, 1951 |
| 2,729,581 | Pascoe et al. | Jan. 3, 1956 |
| 2,829,587 | Russell | Apr. 8, 1958 |
| 2,831,791 | Downes et al. | Apr. 22, 1958 |
| 2,849,345 | Smith et al. | Aug. 26, 1958 |
| 2,983,635 | Richardson | May 9, 1961 |
| 2,995,480 | Williams | Aug. 8, 1961 |

FOREIGN PATENTS

| | | |
|---|---|---|
| 989,338 | France | May 23, 1951 |